United States Patent
Hayes et al.

(10) Patent No.: US 7,530,089 B1
(45) Date of Patent: May 5, 2009

(54) SYSTEM AND METHOD FOR IMPROVING VIDEO QUALITY USING A CONSTANT BIT RATE DATA STREAM

(75) Inventors: Hasler Hayes, Munster Hamlet (CA); Anoop Nannra, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 998 days.

(21) Appl. No.: 10/812,264

(22) Filed: Mar. 29, 2004

(51) Int. Cl.
- *H04N 7/173* (2006.01)
- *H04N 7/12* (2006.01)
- *H04N 11/02* (2006.01)

(52) U.S. Cl. .......................... 725/95; 725/90; 725/97; 375/240.01

(58) Field of Classification Search .................... 725/90, 725/87; 375/240.01–240.29; 382/232
See application file for complete search history.

(56) References Cited

U.S. PATENT DOCUMENTS

| | | | | |
|---|---|---|---|---|
| 5,541,852 A * | 7/1996 | Eyuboglu et al. | ........... | 709/232 |
| 6,040,866 A * | 3/2000 | Chen et al. | ............... | 348/419.1 |
| 6,044,396 A * | 3/2000 | Adams | ........................ | 725/95 |
| 6,192,154 B1 * | 2/2001 | Rajagopalan et al. | ....... | 382/232 |
| 7,106,799 B1 * | 9/2006 | Sostawa et al. | ......... | 375/240.24 |
| 7,369,743 B2 * | 5/2008 | Watkins et al. | ................ | 386/46 |
| 2002/0122481 A1 * | 9/2002 | Mine | ..................... | 375/240.01 |
| 2002/0174438 A1 * | 11/2002 | Cleary et al. | ................ | 725/100 |
| 2003/0093803 A1 * | 5/2003 | Ishikawa et al. | .............. | 725/94 |

* cited by examiner

*Primary Examiner*—Hunter B. Lonsberry
(74) *Attorney, Agent, or Firm*—David A. Dagg

(57) ABSTRACT

A system providing video data in which a constant bit rate data stream is provided between a video source and a video destination, and has a fixed data rate exceeding a predetermined minimum display rate associated with the video destination. Video data is conveyed from the video source to the video destination at the data rate, and is processed for display at the video destination at a varying display rate, between a minimum rate and a maximum rate. The minimum video data display rate at the video destination is less than the fixed data rate of the stream between the video source and the video destination, and excess received video data is stored in buffers in the video destination. Display of the received video data by a display device at the video destination is delayed from when the video data is received by a delay period, allowing buffers at the video destination to fill with video data. When display of the data is initiated, using the buffered video data, the video quality of the display can be improved, incorrectly received or missing frames can be retransmitted and received, and/or a fast forward function can be supported.

11 Claims, 2 Drawing Sheets

SYSTEM AND METHOD FOR IMPROVING VIDEO QUALITY USING A CONSTANT BIT RATE DATA STREAM

FIELD OF THE INVENTION

The present invention relates generally to conveying video information over a communications network, and more specifically to a system and method for improving video quality using a constant bit rate stream.

BACKGROUND OF THE INVENTION

As it is generally known, digitized video data corresponding to a sequence of video scenes has a variable bit rate, since the amount of video data needed to generate each scene varies. For example, data rates for a video data stream originating from a broadcast quality source, such as from a DVD (Digital Versatile Disc) or similar source, vary from 10 Mbps or more down to a few 100 kbps, depending on the scene. However, when video data is transmitted across a communication network to a typical home, it passes through at least one relatively limited bandwidth channel. For example, when video data is passed over what is sometimes referred to as a "last mile" communication link to home equipment, a limited bandwidth channel is used. Such last mile technologies include satellite, coax cable or twisted pair, and typically are limited to between 3 and 4 Mbps of bandwidth. In existing systems, video data is sent over such links using a constant bit rate stream. The constant bit rate is selected such that data is not transferred faster than can be consumed by the real-time processing in the home equipment to generate the image. Such systems have limited capability to buffer video data that is transferred beyond what is immediately used in the receiving equipment to generate the display. Available video data exceeding the constant bit rate is accordingly not transferred. Accordingly, video data for a relatively complex scene cannot be fully transferred to the home equipment. Picture quality therefore suffers during scenes requiring relatively large amounts of video data, since the full set of video data is not available to the home equipment.

Moreover, because existing systems include minimal end system buffering, they operate by essentially transmitting video data in a continuous FIFO (First In First Out) manner, and retransmission of lost or damaged packets is not requested. This approach also prevents users from being able to fast forward through scenes as they watch the video, since there is no significant amount of video data available beyond that being used to generate the current scene.

For the above reasons, it would be desirable to have a new system for delivering digitized video information to an end user system that does not result in picture quality degradation for complex high data rate scenes. The new system should also enable retransmission of video frames in the case of an error, and allow a user to fast forward through video data beyond that for the current scene.

SUMMARY OF THE INVENTION

To address the above described and other shortcomings of existing systems, a system and method for providing video data are disclosed, in which a video source receives variable bit rate video data and transcodes the video data into a constant bit rate data stream transmitted to a video destination. The constant bit rate stream used between the video source and the video destination has a data rate exceeding a predetermined minimum display rate at the video destination. The video source operates to continuously transmit video data through the constant bit rate stream, such that video data for future scenes is conveyed over the stream in advance whenever bandwidth is available within the stream and buffers are available at the video destination.

The video data is processed for display at the video destination at a variable bit rate, varying between the minimum display rate and a maximum display rate. The minimum display rate at the video destination is less than the data rate of the constant bit rate data stream between the video source and the video destination, and excess received video data is stored in buffers at the video destination. The video destination operates to transcode the buffered video data received over the constant bit rate stream into at a variable bit rate stream appropriate for conversion to a signal for a display device.

In another aspect of the disclosed system, display of the received video data by a display device at the video destination is delayed from when the video data is received. The delay period allows buffers at the video destination to fill with video data, so that video data stored in the buffers can be used to support the varying display rate, incorrectly received or missing frames can be requested, retransmitted and received, and a fast forward function can be supported. The length of the delay period may be responsive to a type of video data being conveyed. Accordingly, factors such as whether the video data represents a live event or a movie can be considered in determining the length of the delay period.

The variable bit rate at which the video data is processed for display at the video destination is changed as necessary to generate the display. The disclosed system allows the display rate to vary across a greater range than existing systems, so that improved display quality can be provided. Thus, when a scene requiring relatively large amounts of video data occurs, such as an explosion or the like, the display rate can increase to a rate above the fixed rate of the constant bit rate connection, using the video data buffered in the video destination to effectively display the scene.

In the event that a video data frame is determined to be damaged or missing by the video destination, the video destination can request retransmission of the frame. When the retransmitted frame is correctly received at the video destination, a relative location of the frame in the data stream is determined, as well as a corresponding location within the buffers of the video destination. The retransmitted frame is then written into the correct location within the buffers.

In another aspect of the disclosed system, the user may be provided with fast forwarding capabilities. Upon detection of a fast forward command, the disclosed system operates to increase the display rate, processing the video data buffered in the video destination, thus providing an effective fast forward function within a substantially realtime video data delivery system.

Thus there is disclosed a system for delivering digitized video data over a network to an end user that improves picture quality for high data rate scenes. The disclosed system further enables retransmission of frames in the case of an error, and allows a user to fast forward through received and buffered video data.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
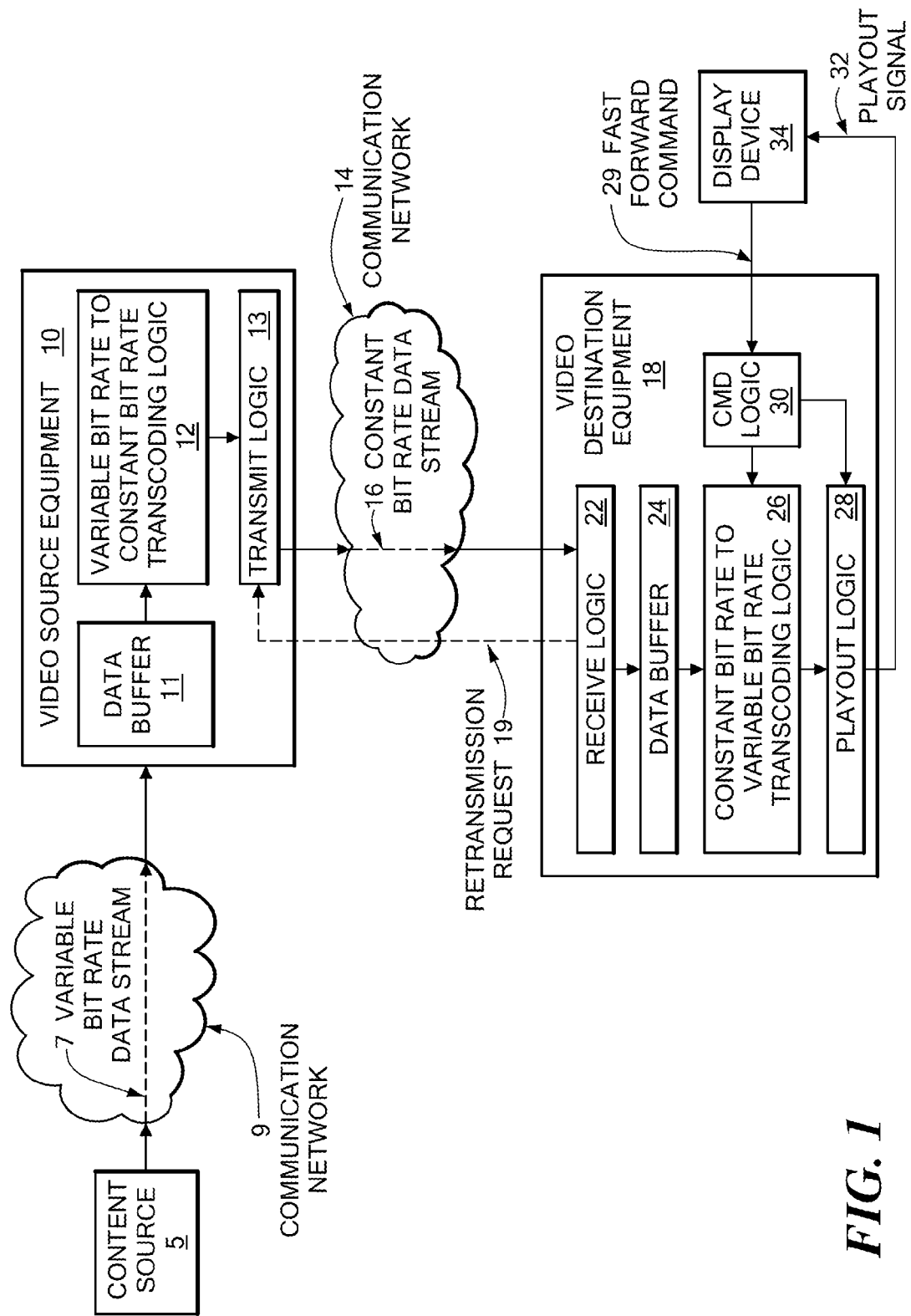
FIG. 1 is a block diagram showing video source equipment connected to a content source and video destination equipment in an illustrative embodiment.

As shown in the illustrative embodiment of FIG. 1, video source equipment 10 is connected to a communication network 9 and a communication network 14. The video source equipment 10 is shown including a data buffer 11, variable bit rate to constant bit rate transcoding logic 12, and transmit logic 13. Content source 5 is also shown connected to the communication network 9, and video destination equipment 18 is shown connected to the communication network 14, and is further connected to a display device 34. The video destination equipment 18 is shown including receive logic 22, data buffer 24, constant bit rate to variable bit rate transcoding logic 26, playout logic 28, and command processing logic 30. The content source 5, video source equipment 10, and video destination equipment 18 may be embodied within or including one or more personal computer systems, servers, communication devices, such as switches, bridges, routers, or the like, having one or more processors, computer program storage components, communication interfaces, specialized hardware circuitry, and/or other components. The logic blocks within the video source equipment 10 and the video destination equipment 18 may each be embodied using software, hardware, or some combination of software and hardware. The communication networks 9 and 14 may be embodied using any appropriate communication media and/or protocols. Additionally, while the video source equipment 10 is shown communicating with the content source 5 and the video destination equipment 18 over communication networks 9 and 14, the source communication equipment 10 may alternatively be connected directly to the content source 5 and/or video destination equipment 18. Similarly, while the content source 5 is shown as an independent piece of equipment from the video source equipment 10, the content source 5 and video source equipment 10 may alternatively be embodied within a single piece of equipment or device. The video destination equipment may be embodied as or including a device generally referred to as a Personal Video Recorder (PVR) or Digital Video Recorder (DVR). The display device 34 may be embodied as a television or other specific type of device.

During operation of the components shown in FIG. 1, the video source equipment 10 receives digital video data in a variable bit rate data stream from the content source 5, and stores the received data in the data buffer 11. The variable bit rate to constant bit rate transcoding logic 12 transcodes the received data in the buffer 11 to generate and transmit, using the transmit logic 13, a constant bit rate data stream 16 sent to the video destination equipment 18 over the communication network 14. The video destination equipment 18 receives the constant bit rate data stream 16 through the receive logic 22, and stores the received video data in the data buffer 24. The constant bit rate to variable bit rate transcoding logic 26 operates to transcode the video data stored in the data buffer 24 into a variable bit rate data stream for processing by the playout logic 28 into a playout signal that is passed to the display device 34. For example, the playout logic 28 may operate to produce an analog signal for the playout signal 32, that is then passed for display to a television serving as the display device 34.

The data rate of the variable bit rate data stream generated by the constant bit rate to variable bit rate transcoding logic 26 varies between a minimum and a maximum display rate. For example, the minimum display rate might be a few 100 kbps, while the maximum display rate might be greater than 10 Mbps. The data rate of the constant bit rate data stream 16 is selected to be greater than the minimum display rate. When the data rate of variable bit rate data stream generated by the constant bit rate to variable bit rate transcoding logic 26 is less than the data rate of the constant bit rate data stream 16, the excess video data received over the constant bit rate data stream 16 is stored in the data buffer 24. Also, conversion of the received video data from the constant bit rate data stream 16 into the variable bit rate data stream for the playout logic 28 is delayed from when the video data is received at the video destination equipment 18. This delay period also allows video data for future scenes to accumulate in the data buffer 24. When the data rate of the variable bit rate stream generated by the constant bit rate to variable bit rate transcoding logic 26 is greater than the data rate of the constant bit rate data stream 16, the video data stored in the data buffer 24 can be used to accommodate the higher data rate.

The delay period prior to display of the received video data through the video destination equipment 18 may be based on the type of content represented by the video data being passed between the video source equipment 10 and the video destination equipment 18. For example, in the event that the video data represents a live event, then the delay period may be set to a relatively shorter value, while if the video data represents pre-made content, such as a movie, a longer delay period may be used.

A fast forward command 29 may be passed from the display device 34 to the command logic 30. Upon receipt of the fast forward command 29, the command logic 30 operates to increase the data rate of the variable bit rate data stream generated by the constant bit rate to variable bit rate transcoding logic 26, thus fast forwarding through the video data stored in the data buffer 24. The data rate of the variable bit rate data stream may, for example, be increased by a predetermined amount for a time period indicated by the fast forward command, and/or continuously increase as the fast forward command is continuously asserted by the user.

In the event that a frame or other message type including the video data passed over the constant bit rate data stream 16 is determined to be lost or damaged by the video destination equipment 18, the receive logic 22 operates to send a retransmission request 19 to the video source equipment 10. The transmit logic 13 in the video source equipment 10 retransmits the frame to the video destination equipment 18. The retransmitted frame is then stored in the appropriate location within the data buffer 24, corresponding the location in the data stream of the lost or damaged frame.

In one embodiment, the variable bit rate data stream 7, and the variable bit rate data stream generated by the constant bit rate to variable bit rate transcoding logic 26 for the playout logic 28, are compressed video data. For example, such compressed video data may be MPEG-2 compressed video, which is based on an ISO/ITU standard for compressing video. Other possible types of compressed video that may be used for the variable bit rate data stream 7 and the variable bit rate data stream generated by the constant bit rate to variable bit rate transcoding logic 26 include MPEG-1, MPEG-4, M-JPEG, and others.

Figure 2:
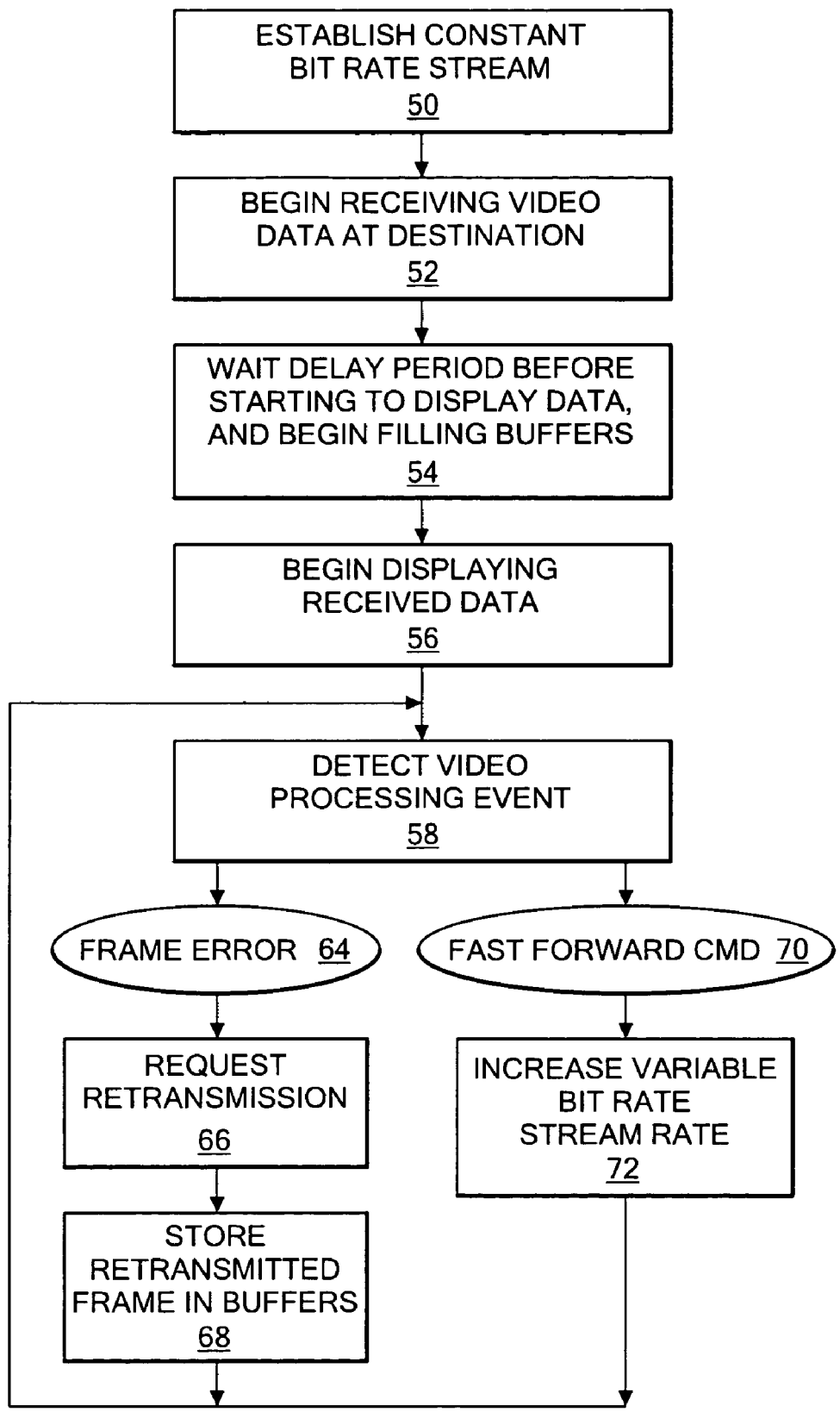
FIG. 2 is a flow chart showing steps performed during operation of the illustrative embodiment of the disclosed system.

FIG. 2 is a flow chart showing steps performed by an illustrative embodiment of the disclosed system. As shown in FIG. 2, at step 50, the disclosed system operates to establish a constant bit rate data stream containing video data between a video source and a video destination. The data rate of the constant bit rate data stream established at step 50 is higher than a minimum display rate at which video data is processed to generate a display at a video destination. At step 52, the video destination begins receiving the video data from the video source over the constant bit rate stream. At step 54, the video destination waits a delay period before starting to display the video data on a display device. During this delay, buffers within the video destination are filled with video data.

At step 56, following the delay period, the video destination begins displaying the video data on a display device. When the data rate needed to display a scene goes above the data rate of the constant bit rate data stream, video data stored in the buffers within the buffers of the video data destination is used to provide the necessary data. At step 58, the video destination may detect a video processing event, such as a frame error 64, or a fast forward command 70. In the event that a frame error 64 is detected, then the video destination requests retransmission at step 66. After the retransmitted frame is successfully received, the video destination stores the frame in its buffers at step 68. In the event that a fast forward command 70 is received, then the video destination operates at step 72 to increase the data rate of the variable bit rate stream used to generate a display signal to a display device using video data stored in the buffers of the video destination. This provides a way for a user to fast forward through future scenes.

The above description of the preferred embodiments include a flowchart and a block diagram illustration of methods, apparatus (systems) and computer program products according to an embodiment of the invention. Those skilled in the art will recognize that the specific orders of steps shown in the flow chart are given purely for purposes of illustration, and that the actual order in which the described operations are performed may vary between embodiments, configurations, or based on specific operational conditions. It will be further understood that each block of the flowchart and block diagram illustrations, and combinations of blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem.

Finally, while the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

We claim:

1. A method for providing video data, comprising:
receiving video data in a variable bit rate data stream at a video source;
transcoding said video data into a constant bit rate data stream between said video source and a video destination, wherein said constant bit rate data stream has a data rate exceeding a minimum display rate;
receiving said video data in said constant bit rate stream at said video destination;
delaying display of said video data at said video destination by a delay period, wherein the length of said delay period is based on the type of content represented by said video data;
transcoding said video data into a variable bit rate stream for variable bit rate display processing to generate a display at said video destination, said variable bit rate display processing varying between said minimum display rate and a maximum display rate; and
storing excess received video data in at least one buffer within said video destination.

2. The method of claim 1, further comprising wherein said delay period is determined responsive to whether said video data represents a live event.

3. The method of claim 1, further comprising:
receiving at least one retransmitted video data message at said video destination;
determining a location in said at least one buffer where a corresponding previous video data message belonged; and
writing said at least one retransmitted video data message into said at least one buffer at said determined location.

4. The method of claim 1, further comprising:
receiving a fast forward user command at said video destination; and
increasing said display rate responsive to said received fast forward user command.

5. The method of claim 1, wherein said video destination includes a personal video recorder device, wherein said personal video recorder includes a hard disc storage component, and wherein said at least one buffer is defined within said hard disc storage component.

6. A system for providing video data, comprising:
video source equipment operable to receive video data in a variable bit rate data stream and to transcode said video data into a constant bit rate data stream between said video source equipment and video destination equipment, wherein said constant bit rate data stream has a data rate exceeding a minimum display rate; and
wherein said video destination equipment is operable to receive said video data in said constant bit rate stream, to delay display of said video data at said video destination by a delay period, wherein the length of said delay period is based on the type of content represented by said video data, to transcode said video data into a variable bit rate stream for variable bit rate display processing to generate a display at said video destination, said variable bit rate display processing varying between said minimum display rate and a maximum display rate, and to store excess received video data in at least one buffer within said video destination.

7. The system of claim 6, wherein said video destination equipment is further operable to determine said delay period responsive to whether said video data represents a live event.

8. The system of claim 6, wherein said video destination equipment is further operable to receive at least one retransmitted video data message at said video destination, to determine a location in said at least one buffer where a corresponding previous video data message belonged, and to write said at least one retransmitted video data message into said at least one buffer at said determined location.

9. The system of claim 6, wherein said video destination equipment is further operable to receive a fast forward user command at said video destination, and to increase said display rate responsive to said received fast forward user command.

10. The system of claim 6, wherein said video destination includes a personal video recorder device, wherein said personal video recorder includes a hard disc storage component, and wherein said at least one buffer is defined within said hard disc storage component.

11. A system for providing video data, comprising:
  means for receiving video data in a variable bit rate data stream at a video source;
  means for transcoding said video data into a constant bit rate data stream between said video source and a video destination, wherein said constant bit rate data stream has a data rate exceeding a minimum display rate;
  means for receiving said video data in said constant bit rate stream at said video destination;
  means for delaying display of said video data at said video destination by a delay period, wherein the length of said delay period is based on the type of content represented by said video data;
  means for transcoding said video data into a variable bit rate stream for variable bit rate display processing to generate a display at said video destination, said variable bit rate display processing varying between said minimum display rate and a maximum display rate; and
  means for storing excess received video data in at least one buffer within said video destination.

\* \* \* \* \*